US010396646B2

(12) United States Patent
Reiter et al.

(10) Patent No.: US 10,396,646 B2
(45) Date of Patent: Aug. 27, 2019

(54) MICRO VALUE COMPRISING AN ELECTRODYNAMIC ACTUATOR HAVING STATIONARY MAGNET ARRANGEMENT AND A MOVEABLE AIR-CORE COIL

(71) Applicant: Buerkert Werke GmbH, Ingelfingen (DE)

(72) Inventors: Cyril Reiter, Ingelfingen (DE); Maik Fuchs, Dresden (DE); Johannes Dierks, Oehringen (DE); Raoul Schroeder, Neuenstein (DE); Ralf Scheibe, Kuenzelsau OT Garnberg (DE); Christian Hartmann, Krautheim (DE)

(73) Assignee: BUERKERT WERKE GMBH, Ingelfingen (DE)

( * ) Notice: Subject to any disclaimer, the term of this patent is extended or adjusted under 35 U.S.C. 154(b) by 1025 days.

(21) Appl. No.: 14/483,549

(22) Filed: Sep. 11, 2014

(65) Prior Publication Data

US 2015/0069860 A1    Mar. 12, 2015

(30) Foreign Application Priority Data

Sep. 12, 2013    (DE) .................. 10 2013 110 029

(51) Int. Cl.
*H02K 33/18*    (2006.01)
*F04B 19/00*    (2006.01)
(Continued)

(52) U.S. Cl.
CPC .......... *H02K 33/18* (2013.01); *F04B 19/006* (2013.01); *F04B 43/043* (2013.01);
(Continued)

(58) Field of Classification Search
CPC ........ F16K 31/08; F16K 31/082; F16K 31/02; F16K 99/0042; F16K 99/0046;
(Continued)

(56) References Cited

U.S. PATENT DOCUMENTS 3,076,153 A * 1/1963 Rieckman .............. H02K 33/18
                                                    310/22
3,729,691 A * 4/1973 Beiswinger .............. H03B 5/30
                                                    310/15
(Continued)

FOREIGN PATENT DOCUMENTS

CH        665509 A5    5/1988
CN       1270289 A1   10/2000
(Continued)

OTHER PUBLICATIONS

Dierks Johannes, Winkler Michael, Microvalve or Micropump Having an Electromagnetic Actuator, Jun. 17, 2010, WO 2010066459 (English Machine Translation).*
(Continued)

*Primary Examiner* — Julio C. Gonzalez
*Assistant Examiner* — Alexander A Singh
(74) *Attorney, Agent, or Firm* — Hauptman Ham, LLP

(57) ABSTRACT

An electrodynamic actuator, in particular for a microvalve or a micropump, includes a magnet arrangement for generating a magnetic field and a control element movable relative to the magnet arrangement. The control element includes an energizable air-core coil (22) which is arranged in the magnetic field and firmly coupled to a coil carrier (20) made from a nonmagnetic material.

22 Claims, 5 Drawing Sheets

(51) Int. Cl.
F04B 43/04 (2006.01)
F16K 99/00 (2006.01)
H02K 41/035 (2006.01)

(52) U.S. Cl.
CPC ...... *F16K 99/0015* (2013.01); *F16K 99/0042* (2013.01); *F16K 99/0046* (2013.01); *H02K 41/0356* (2013.01); *H02K 41/0358* (2013.01); F16K 2099/0094 (2013.01)

(58) Field of Classification Search
CPC ........... F16K 2099/0094; F16K 99/015; F16K 99/0015; H02K 41/00; H02K 41/02; H02K 41/025; H02K 41/03; H02K 41/031; H02K 41/033; H02K 41/0352; H02K 41/0354; H02K 41/0356; H02K 41/0358; H02K 41/06; H02K 41/065; H02K 33/18; H02K 1/182; H02K 21/026; F04B 43/043; F04B 43/04; F04B 19/06; F04B 99/015
USPC .. 310/32, 12.05, 12.01, 12.02, 12.03, 12.04, 310/12.06, 12.09, 12.11, 12.12, 12.13, 310/12.14, 12.15, 156.32
See application file for complete search history.

(56) References Cited

U.S. PATENT DOCUMENTS

| | | | | |
|---|---|---|---|---|
| 4,080,542 | A | * | 3/1978 | De Graffenried ..... H01F 7/0278 310/159 |
| 4,216,938 | A | | 8/1980 | Inada et al. |
| 4,498,023 | A | | 2/1985 | Stout |
| 4,707,754 | A | | 11/1987 | Patel et al. |
| 5,337,785 | A | | 8/1994 | Romer |
| 6,175,168 | B1 | * | 1/2001 | Budd ..................... H01F 7/127 310/12.02 |
| 6,318,408 | B1 | | 11/2001 | Fukano et al. |
| 2002/0158727 | A1 | | 10/2002 | Namen |
| 2003/0107018 | A1 | * | 6/2003 | Hettinger .............. F16K 11/052 251/129.19 |
| 2004/0119343 | A1 | * | 6/2004 | Ueda ....................... B06B 1/045 310/12.16 |
| 2004/0207270 | A1 | * | 10/2004 | Asou ........................ B23Q 1/58 310/12.31 |
| 2005/0253104 | A1 | | 11/2005 | Sato et al. |
| 2011/0115327 | A1 | * | 5/2011 | Pan ........................ H02K 1/148 310/156.36 |
| 2011/0133577 | A1 | | 6/2011 | Lee |

FOREIGN PATENT DOCUMENTS

| | | | |
|---|---|---|---|
| CN | 1696554 | A | 11/2005 |
| DE | 10330460 | A1 | 1/2005 |
| DE | 202004012046 | U1 | 12/2005 |
| DE | 102010050754 | A1 | 5/2012 |
| DE | 102011117838 | A1 | 5/2012 |
| EP | 1382907 | A1 | 1/2004 |
| EP | 2003326 | B1 | 12/2008 |
| EP | 1542345 | B1 | 4/2010 |
| EP | 2275729 | A2 | 1/2011 |
| EP | 2270779 | B1 | 3/2012 |
| JP | S54-73324 | A | 6/1979 |
| JP | H04-355653 | A | 12/1992 |
| JP | 5-321621 | A | 12/1993 |
| JP | 05-321621 | A | 12/1993 |
| JP | 2000-217330 | A | 8/2000 |
| JP | 2000324789 | A * | 11/2000 |
| JP | 2004-518093 | A | 6/2004 |
| JP | 2005-163924 | A | 6/2005 |
| WO | 2008/041171 | A2 | 4/2008 |
| WO | 2009/097868 | A1 | 8/2009 |
| WO | 2010066459 | A1 | 6/2010 |
| WO | WO 2010066459 | A1 * | 6/2010 ............ F15B 15/223 |

OTHER PUBLICATIONS

Motoi Takeshi, Kozuma Takashi, Drive Coil for Linear Motor and Manufacture Thereof, Nov. 24, 2000, JP 2000324789 (English Machine Translation).*
Wikipedia, "Luftspule", 4 pages.
Wikipedia, "Leiterplatte", 1 page.
Opposition Brief dated Jun. 30, 2016 in connection with the counterpart German Patent Application No. 102013110029.5.
Chinese Office Action dated Jul. 19, 2017 from SIPO in connection with the counterpart Chinese Patent Application No. 201410461322.6.
German Search Report dated Apr. 17, 2014.

* cited by examiner

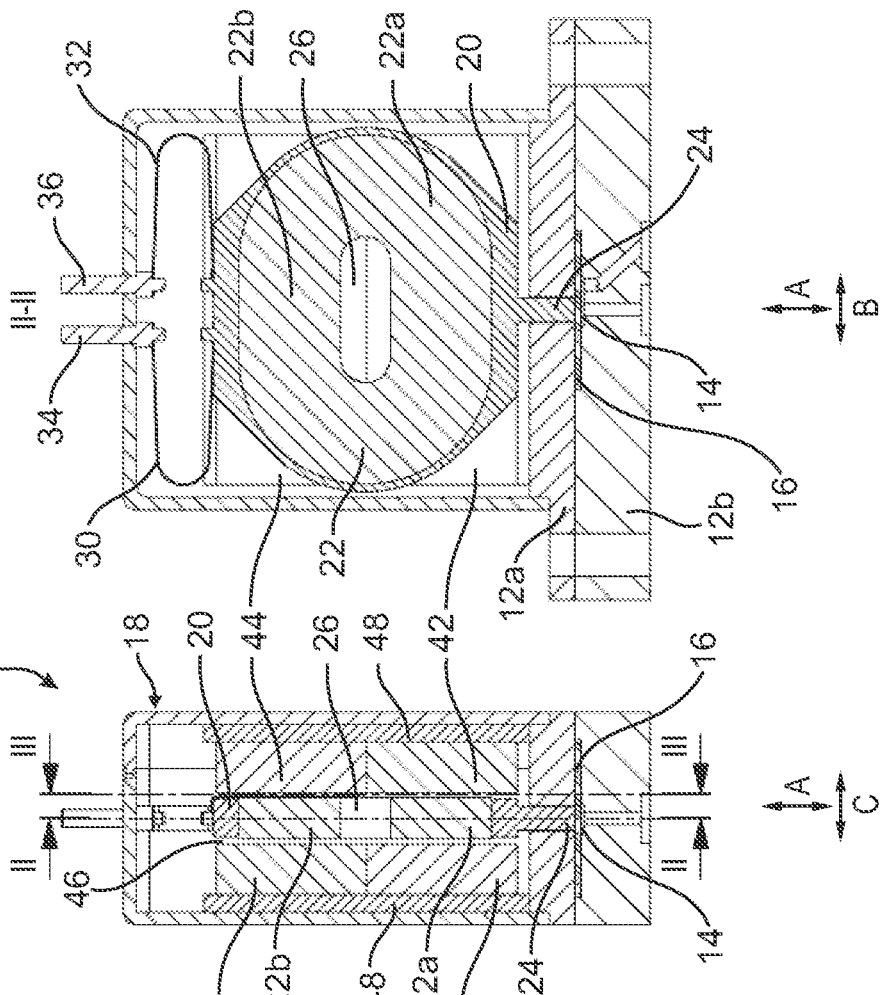

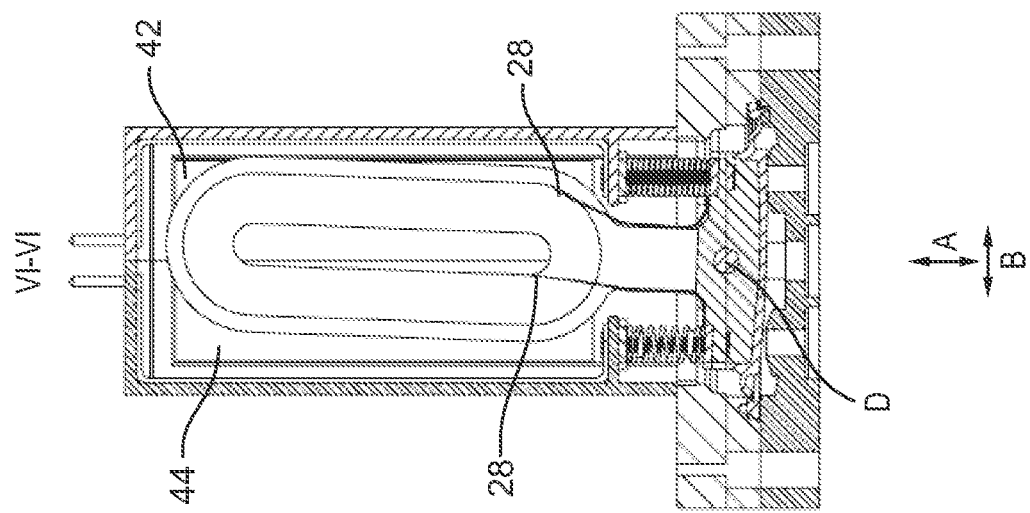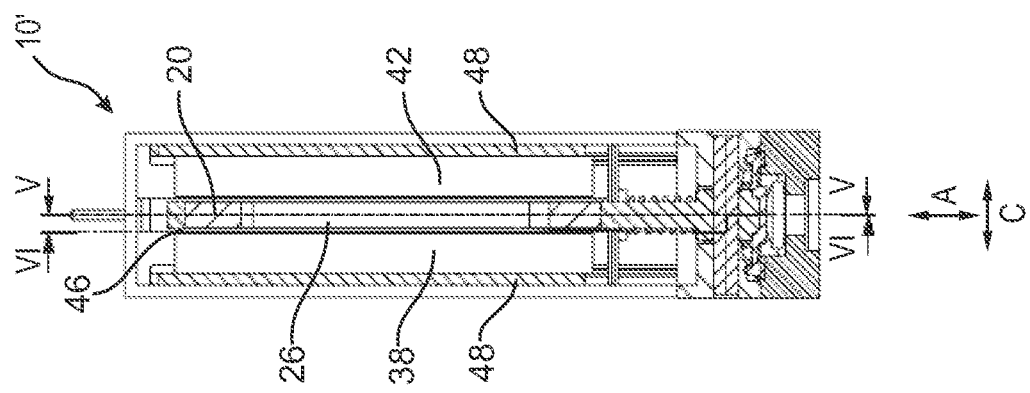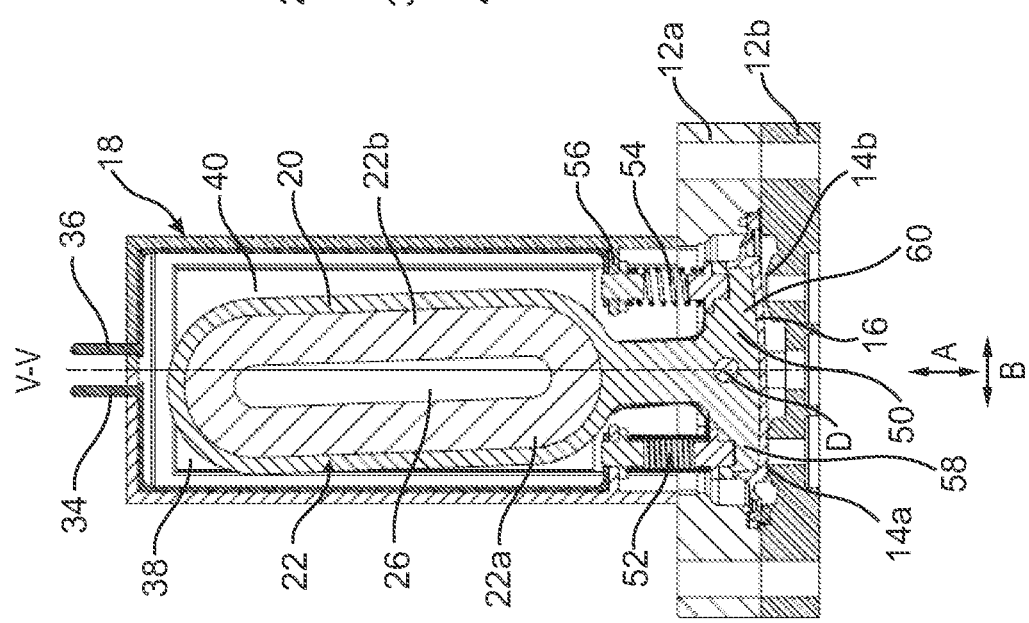

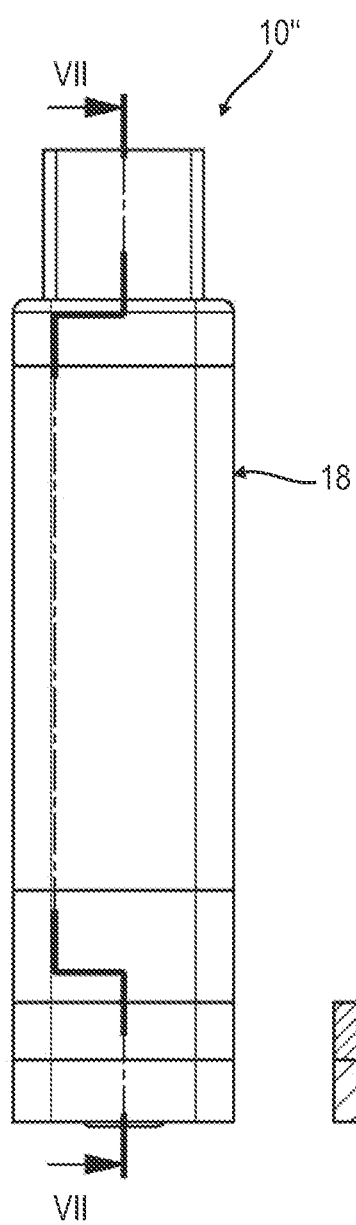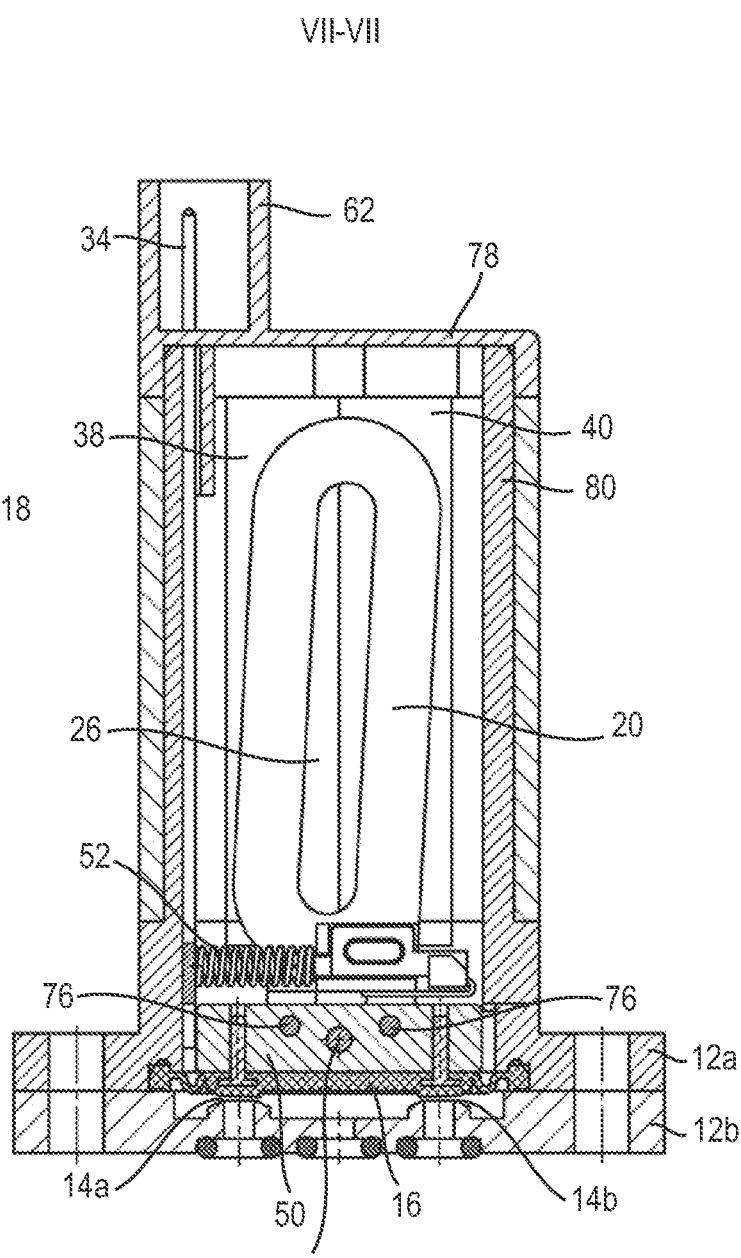

10,396,646 B2

MICRO VALUE COMPRISING AN ELECTRODYNAMIC ACTUATOR HAVING STATIONARY MAGNET ARRANGEMENT AND A MOVEABLE AIR-CORE COIL

CROSS REFERENCE TO RELATED APPLICATION

This application claims the priority of German Patent Application No. 10 2013 110 029.5, filed on Sep. 12, 2013 in the German Patent and Trade Mark Office, the disclosure of which is incorporated herein in its entirety by reference.

The invention relates to an electrodynamic actuator, in particular for a microvalve or a micropump.

In fluid valve technology, electromagnetic actuators are frequently used. In most of these actuators, an armature made of a magnetic material is moved by means of a magnetic field generated by a coil. Especially when a miniaturization is desired, the options to design so as to save space, on the one hand, and to provide sufficient magnetic force, on the other hand, are limited. This is due to the fact that with ever smaller coils, the obtainable magnetic field strength greatly decreases or, in other words, the maximum possible current is limited.

In contrast to this, the magnetic field strength in electrodynamic drives depends on the volume of the permanent magnets employed in the drive, with a reduction of the volume of the permanent magnets having a comparatively smaller impact on the magnetic field strength available in the drive than the reduction of the coil size in an electromagnetic actuator.

WO 2010/066459 A1 discloses a microvalve or a micropump having a powerful electrodynamic actuator which can be operated with a low electric voltage. The actuator includes a control element which is mounted for linear movement and which has a spiral conductor track printed thereon. When the conductor track is energized, a magnet arrangement exerts a Lorentz force on the control element having the spiral conductor track, whereby the control element is deflected. Any restoring element is not provided since the restoring process is to be attained by a reversal of the direction of current flow.

The object of the invention is to provide an effective electrodynamic actuator which can be manufactured at low cost and is suitable in particular for miniature applications.

This object is achieved by an electrodynamic actuator having the features of claim 1. Advantageous and useful further configurations of the electrodynamic actuator according to the invention are recited in the associated dependent claims.

The electrodynamic actuator according to the invention, which is intended to be used in particular in a microvalve or a micropump, includes a magnet arrangement for generating a magnetic field and a control element movable relative to the magnet arrangement. According to the invention, the control element includes an energizable air-core coil which is arranged in the magnetic field and firmly coupled to a coil carrier made from a nonmagnetic material.

The invention is based on the fundamental idea that the Lorentz force can be utilized as a drive force for an actuator if the control element of the actuator includes a coil which is arranged in a magnetic field and to which a current is applied for deflection of the control element. In the present invention, this concept is put to practice in a particularly effective way in that the coil used is an air-core coil which is firmly coupled to a nonmagnetic coil carrier. As is known, an air-core coil is a wire or cable that is wound many times around a magnetically non-soft material (usually, but not necessarily air) without a magnetically soft core. The non-magnetic coil carrier is to be non-magnetizable and may be formed from a plastic material, for example. When configured accordingly, the coil carrier, being firmly coupled to the air-core coil, can be utilized directly for a manipulation of a diaphragm, for deflection of a sealing member, etc.

The electrodynamic actuator according to the invention is very powerful. Its force is directly dependent on the current intensity of the current flowing through the air-core coil, the magnetic field, and the distance between the air-core coil and the magnetic field. Since the distance between the air-core coil and the magnetic field is constant, the force will not change as a result of a change in stroke. This allows large strokes with a comparatively large force transmission to be achieved, whereas in conventional solenoid valves the available force greatly decreases as the stroke decreases.

The structure according to the invention of the electrodynamic actuator requires only a very small number of parts and therefore allows very small overall sizes to be realized, so that the actuator can be employed in microvalves or micropumps. For example, valves having a width of only 7 to 8.5 mm, a length of only 12 to 14 mm and a height of only 22 to 35 mm can be realized. According to the invention, it is even feasible to produce valves having a width of only 4 mm. It is also possible to stack a plurality of air-core coils and magnet arrangements on top of each other within one actuator, something which, for a specified power, permits even narrower dimensions with respect to the base area (the overall size is frequently not (so) relevant in valve technology). Further advantages of the structure according to the invention, involving few components, include the cost-effective manufacture and the negligible tolerance problems, in particular with respect to the working stroke. In addition, in comparison with a simple electromagnetic actuator, the electrodynamic actuator according to the invention is very quiet during the switching process because there is no metal-on-metal contact in the end positions of the control element. A further advantage of the electrodynamic actuator according to the invention resides in that it can be used both in on/off valves and in proportional valves without any design changes having to be made, such as, e.g., the installation of a thrust cone in electromagnetic drives. A proportional valve is simple to realize since the stroke is directly proportional to the current intensity.

A structural arrangement in which a first half of the air-core coil is arranged in a first magnetic field having a first principal direction and the second half of the air-core coil is arranged in a second magnetic field having a second principal direction opposed to the first principal direction is particularly preferred. In such a configuration, the different polarities (north pole/south pole) of permanent magnets arranged next to each other can be effectively utilized to put a large part of the winding sections to good use for generating the drive force. Since most of the current flows in opposite directions in the winding halves of the air-core coil, a Lorentz force is generated in both cases which acts in the same direction, so that a large overall drive force results therefrom.

Of particular advantage is the use of an air-core coil which generally has the shape of an oval with a longitudinal axis, preferably the shape of a pair of complementary semicircles spaced from each other and having a linear middle piece connecting the semicircles, the longitudinal axis dividing the air-core coil into the two halves which are traversed by the oppositely oriented magnetic fields. An oval shape of the air-core coil has the advantage that larger winding sections contribute to the force generation than in the case of a circular coil. As a result, a greater force is available in the direction of movement of the control element. Basically, however, circular or angular coils may also be used.

According to a first preferred embodiment of the invention, the control element is mounted for linear movement in a direction that is perpendicular to the principal directions of the magnetic fields. Depending on the current flow direction(s) in the winding sections of the air-core coil that are utilized for force generation, the direction of the linear mounting should further be selected such that it coincides with the (principal) direction of the Lorentz force. This allows the Lorentz force to be made use of most effectively as the drive force without losses. Such a structure is particularly suitable for opening and closing a single valve seat.

According to a second preferred embodiment of the invention, the control element is mounted for swiveling movement about an axis of rotation that is parallel to the principal directions of the magnetic fields. Here, the Lorentz force is made use of in an optimum fashion as the drive force for a swiveling movement. Such a structure is particularly suitable for a mutual opening and closing of two valve seats arranged next to each other.

The magnet arrangement preferably includes a plurality of permanent magnets. In the preferred first embodiment having the control element that is linearly movable perpendicularly to the principal directions of the magnetic fields, the magnetic fields can be made use of most effectively if the permanent magnets are arranged such that their longitudinal axes extend parallel to the longitudinal axis of the air-core coil.

In the second preferred embodiment having the control element mounted for swiveling movement about an axis of rotation that is parallel to the principal directions of the magnetic fields, a configuration in which the longitudinal axis of the air-core coil extends parallel to the longitudinal axis of the permanent magnets in a first switching position of the control element is particularly advantageous. Since in this embodiment the position of the longitudinal axis of the air-core coil changes in relation to the longitudinal axis of the permanent magnets upon swiveling of the control element, in this configuration one of the switching positions of the control element is given a "preferential position" to the effect that the greatest force acts on the control element in exactly this switching position. This aspect will be shown to its full advantage particularly in connection with the restoring element, to be discussed further below, which exerts a preload on the control element.

The permanent magnets of the magnet arrangement should be arranged such that permanent magnets facing each other always face opposite poles.

According to an especially advantageous aspect of the invention, provision is made for a restoring element which exerts a preload on the control element and forms at least part of an electrically conducting connection between a winding end of the air-core coil and an electrical connector of the actuator. The restoring element thus fulfils a dual function in that, on the one hand, it preloads the control element to a particular switching position or operating position and, on the other hand, it obviates the need for a wire connection or the like that would otherwise be required.

Alternatively, however, the contacting may also be performed via a wire connection. In this case, care should be taken that the flexibility of the wire ends is ensured since these ends follow the movements during the switching process. For this purpose, the wire ends may be provided with a coating made from PTFE, for example.

A leaf spring or a helical spring, for example, is suitable for use as the restoring element. A restoring element may also be formed by a plurality of spring members together.

The restoring element may be provided to preload the control element away from the first switching position towards a second switching position. In this case, a comparatively large force is required for holding the control element in the first switching position. In the preferred second embodiment having the swivel-mounted control element, it is, for this reason, particularly advantageous if in the first switching position of the control element the longitudinal axis of the air-core coil extends parallel to the longitudinal axis of the permanent magnets because the maximum possible Lorentz force for holding the control element is then made available exactly in the first switching position.

The magnet arrangement and the control element of the electrodynamic actuator according to the invention may be accommodated in an actuator housing which shields the magnetic fields of the magnet arrangement. This allows any interference from neighboring electric and/or magnetic devices to be avoided.

In accordance with a special aspect of the invention, provision is made in the electrodynamic actuator for at least one yoke plate made of a magnetically soft material which fulfils a dual function: On the one hand, it strengthens the magnetic fields of the magnet arrangement; on the other hand, it shields the magnetic fields to the outside. Use of such yoke plates allows to provide an actuator housing made from plastic material in cases where a stronger shielding is not necessary.

In a preferred embodiment, the yoke plate made of magnetically soft material and having magnetic field strengthening and shielding properties constitutes part of a housing of the actuator.

In an especially cost-effective embodiment, the permanent magnets are attached directly to the inner wall of the (metallic) actuator housing, so that the housing wall fulfils several functions: Aside from the actual protective function, the housing wall additionally serves as a yoke plate and as a shielding. Any respective additional components may thus be dispensed with. Preferably, the permanent magnets constitute a preassembled unit with the housing, something which simplifies the assembly of the electrodynamic actuator.

The air-core coil need not be received in the interior of the coil carrier. Rather, the air-core coil may also be wound on the coil carrier. The latter variant offers advantages in manufacturing since the coil wire is simply wound on the outside of the coil carrier. Preferably, the coil carrier has a support surface for the winding that is limited by lateral walls, to prevent the air-core coil from slipping off the coil carrier both in the winding up process and in operation of the actuator.

For an electrically conducting connection between at least one winding end of the air-core coil and an electrical connector of the actuator, in one embodiment provision is made for an electrically conductive stamped part which is fastened to a housing of the actuator and is mechanically acted upon by an electrically conductive restoring element which exerts a preload on the control element. If it is intended to connect not only one, but both electrical connectors of the actuator (+ and −) to the winding ends in this way, it is required to use two stamped parts which are insulated from one another.

In accordance with an advantageous configuration, the at least one stamped part includes a pin which, together with a housing extension, is part of a plug connector. In this case, the actuator according to the invention may be connected in a simple manner by means of a complementary plug connector adapted to the housing extension and the pin or pins. The housing extension is preferably formed here in a plastic part of the housing, so that an electrical insulation of the connection to the outside is provided for at the same time, without a further shielding.

For an electrically conducting connection between at least one winding end of the air-core coil and an electrical connector of the actuator, additionally or alternatively provision may be made for a contact plate. The contact plate may have an electrically conductive restoring element received thereon which exerts a preload on the control element. In this case, the contact plate serves as a holder for the restoring element and establishes a durable electrical connection to the latter, without a soldering process or the like being required.

The contact plate may also include a mount for the winding end to produce a durable electrical connection.

To simplify the assembly of the electrodynamic actuator according to the invention, it is particularly expedient to configure the coil carrier, the air-core coil, a rocker coupled to or formed integrally with the coil carrier, the at least one contact plate, and the restoring element as a preassembled unit.

To produce the necessary electrical insulation between the housing and the contact plate, a plastic insert taking over this function may be provided in the housing of the actuator. The plastic insert may furthermore also perform other functions such as, e.g., holding a valve diaphragm.

The invention also provides a fluidic component, in particular a microvalve or a micropump, having an electrodynamic actuator according to the invention. With regard to the advantages of the fluidic component according to the invention, reference is made to the corresponding statements made in relation to the electrodynamic actuator according to the invention.

With a view to as compact a structure of the fluidic component as possible, the control element may advantageously include an extension or a rocker cooperating with a diaphragm or with one or two sealing members of the fluidic component. The extension or the rocker may be utilized in particular for opening and closing one or two valve seats.

Further features and advantages of the invention will be apparent from the description below and from the accompanying drawings, to which reference is made and in which:

FIG. 1 shows a sectional view of a valve with an electrodynamic actuator according to the invention, in accordance with a first embodiment;

FIG. 2 shows a sectional view along line II-II in FIG. 1;

FIG. 3 shows a sectional view along line III-III in FIG. 1;

FIG. 4 shows a sectional view of a valve with an electrodynamic actuator according to the invention, in accordance with a second embodiment;

FIG. 5 shows a sectional view along line V-V in FIG. 4;

FIG. 6 shows a sectional view along line VI-VI in FIG. 4;

FIG. 7 shows a sectional view of a valve with an electrodynamic actuator according to the invention, in accordance with a third embodiment, in a neutral position;

FIG. 8 shows a side view of the valve from FIG. 7 for illustrating the sectional profile;

Figure 9:
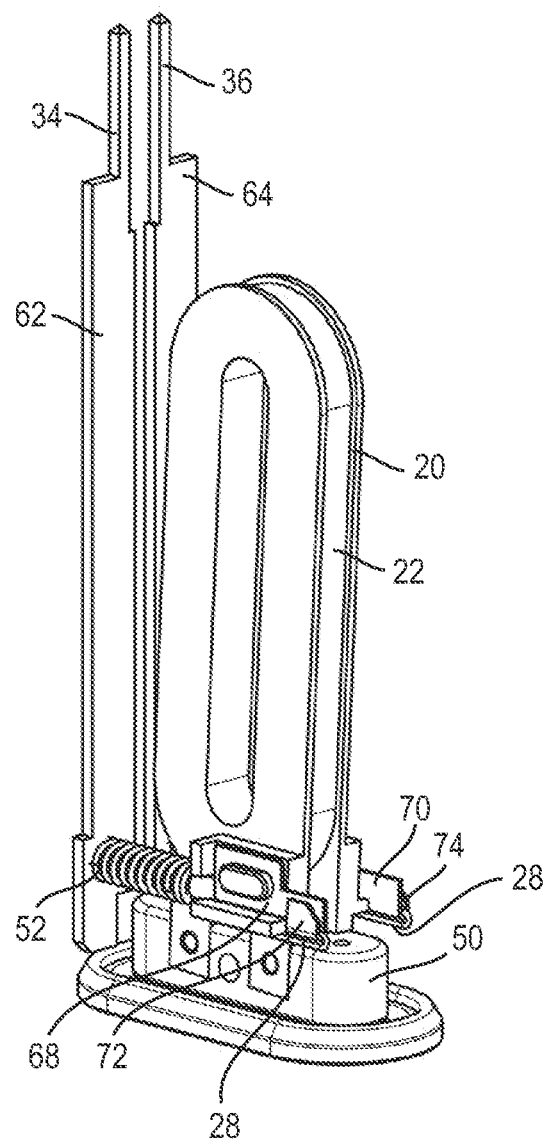
FIG. 9 shows a perspective view of particular components of the valve from FIG. 7.

FIGS. 1 to 3 illustrate a first embodiment of a microvalve 10 having an electrodynamic actuator. The electrodynamic actuator is placed on a two-part fluid housing 12a, 12b in which a valve seat 14 is formed. A diaphragm 16 clamped between the housing halves 12a, 12b can either open or close the valve seat 14 with the aid of the electrodynamic actuator.

The electrodynamic actuator comprises an actuator housing 18 in which a movable control element and an immovable magnet arrangement are accommodated. The control element is formed essentially from a coil carrier 20 made of a non-magnetic material and an air-core coil 22 arranged in the coil carrier 20. The coil carrier 20 engages around the air-core coil 22 and is mounted for linear movement in a direction A. An extension 24 of the coil carrier 20 projects into a recess of the upper half 12a of the fluid housing and cooperates with the diaphragm 16.

The air-core coil 22 is firmly connected with the coil carrier 20, i.e. the coil carrier 20 and the air-core coil 22 always move together. The air-core coil 22 comprises a multitude of windings around a magnetically non-soft core 26 (air or some other non-magnetic material). The windings give the air-core coil 22 generally a substantially oval shape with a longitudinal axis perpendicular to the center axis of the air-core coil. In the exemplary embodiment shown, the air-core coil 22 has the shape of a pair of spaced-apart complementary semicircles with a linear middle piece connecting the semicircles and a longitudinal axis which is oriented in a direction B and is perpendicular to the direction of movement A of the control element.

As can be seen in FIG. 3, the ends 28 of the windings are electrically conductively connected to a restoring element which is electrically conductive itself. In the exemplary embodiment illustrated, the restoring element is formed from two separate, bent leaf springs 30, 32, which are connected to respective electrical connectors 34, 36. In place of the leaf springs 30, 32, electrically conductive spiral springs, helical springs or the like may also be employed as an alternative. The restoring element exerts a preload on the coil body 20 in the direction A downward.

The two electrical connectors 34, 36 project outward from the actuator housing 18 and are firmly attached to it. The electrical connectors 34, 36 are connected to a control circuit for actuation of the electrodynamic actuator.

In the exemplary embodiment illustrated, the magnet arrangement is formed from four permanent magnets 38, 40, 42, 44 which all have identical dimensions here. Two permanent magnets 38, 40 and, respectively, 42, 44 are arranged one on top of the other on two opposite sides of a longitudinal gap 46 in which the control element is located. A transverse gap may further be provided between the two permanent magnets 38, 40 and, respectively, 42, 44 on each side.

The permanent magnets 38, 40, 42, 44 are essentially cuboid-shaped, the longitudinal axes of the permanent magnets 38, 40, 42, 44 extending parallel to the longitudinal axis of the air-core coil 22. The permanent magnets 38, 40, 42, 44 are oriented such that opposite poles (N, S) always face each other in the directions A and in the direction C perpendicular to the directions A and B.

What is essential in the arrangement and orientation of the permanent magnets 38, 40, 42, 44 is that two magnetic fields build up which are arranged on top of each other (with respect to the direction of movement A) and have opposite orientations. The opposite principal directions of the magnetic fields are oriented perpendicularly to the directions A and B, i.e. the field lines of the two magnetic fields are each intended to traverse the longitudinal gap 46 in the direction C, if possible, which is perpendicular to the directions A and B and parallel to the center axis of the air-core coil 22.

In the initial position of the control element as shown in FIGS. 1 to 3, the upper magnetic field of the permanent magnets 40 and 44 penetrates the upper half of the air-core coil 22, whereas the lower magnetic field of the permanent magnets 38 and 42 penetrates the lower half of the air-core coil 22.

To intensify the magnetic fields which act in the longitudinal gap 46, the permanent magnets 38, 40 and, respectively, 42, 44 arranged on top of each other are each coupled magnetically to each other on their sides facing away from the longitudinal gap 46 by means of a yoke plate 48. The yoke plates 48 each form a magnetic yoke. The yoke plates 48 may be formed of iron or some other magnetically soft material.

When a current is applied to the air-core coil 22 via the electrical connectors 34, 36, the direction of current flow in the upper half 22a of the air-core coil 22 is opposed to the direction of current flow in the lower half 22b. Thus, the direction of current flow in the upper air-core coil half 22a is perpendicular to the direction of the upper magnetic field, just as the direction of current flow in the lower air-core coil half 22b is perpendicular to the direction of the lower magnetic field. Therefore, in accordance with the so-called "right-hand rule", a Lorentz force acts on both air-core coil halves 22a, 22b in the same direction. This results in that the air-core coil 22 and the coil carrier 20 together execute a movement in the direction A as the control element. Depending on the polarity of the electrical connectors 34, 36 and the orientation of the magnetic fields, the control element is deflected upward or downward.

The total force acting on the control element depends on the strength of the magnetic fields, the total length of the current-carrying windings, utilizable for force generation, of the air core-coil 22 in the magnetic fields, the current intensity and the size of the longitudinal gap 46 between the permanent magnets 38, 40 and 42, 44.

In the exemplary embodiment shown, in the currentless initial condition the control element is preloaded downward by the restoring element in the form of the leaf springs 30, 32, so that the extension 24 presses the diaphragm 16 on the valve seat 14 and closes it. When a direct current is applied to the electrical connectors 34, 36 in the "correct" polarity, a Lorentz force directed upward acts on the air-core coil 22. This causes the control element to be lifted linearly in the direction A contrary to the preload, so that the extension 24 no longer presses the diaphragm 16 on the valve seat 14. The valve seat 14 is thus open, so that a fluidic communication exists between a valve inlet and a valve outlet. As soon as the current is switched off, the Lorentz force is no longer active, and the restoring element pushes the control element back to the initial condition again.

The restoring element fulfils a dual function here: On the one hand, it exerts a preload on the control element, and on the other hand, it serves as an electrical connection between the winding ends 28 of the air-core coil 22 and the electrical connectors 34, 36.

In place of the diaphragm 16, provision may also be made for a sealing member which is connected with or coupled to the extension 24 and which can close or open a valve seat. In this case, the valve seat may be arranged in a one-piece fluid housing.

It is also possible to arrange two or more air-core coils on top of each other; in that case, a suitable magnetic field should be provided for each air-core coil half.

FIGS. 4 to 6 illustrate a second embodiment of a microvalve 10' comprising an electrodynamic actuator. The same reference numbers have been used for (functionally) identical components. In this respect, reference is made to the above explanations, and the differences from the first embodiment are primarily discussed below.

The electrodynamic actuator is again placed on a two-part fluid housing 12a, 12b in which, however, two valve seats 14a, 14b are formed next to each other. The valve seats 14a, 14b can be mutually opened or closed by a diaphragm 16 clamped between the housing halves 12a, 12b.

The control element which is formed essentially from a coil carrier 20 made of a non-magnetic material and an air-core coil 22 firmly connected with the coil carrier 20 is mounted in the actuator housing 18 for swiveling movement about an axis of rotation D. The coil carrier 20 is connected with a rocker 50 or integrally continues into a rocker 50. The rocker 50 is in the form of a two-armed actuating lever which cooperates with the diaphragm 16.

In contrast to the first embodiment, the longitudinal axis of the air-core coil 22, which again is provided in the form of two spaced-apart complementary semicircles with a linear middle piece connecting the semicircles, here extends in the direction A which is perpendicular to the axis of rotation D and perpendicular to the center axis of the air-core coil 22. Accordingly, the permanent magnets 38, 40, 42, 44 are also arranged and oriented differently here. Two respective permanent magnets 38, 40 and, respectively, 42, 44 are arranged next to one another in a direction B perpendicular to the directions A and C on the two opposite sides of the longitudinal gap 46. The longitudinal axes of the cuboid-shaped permanent magnets 38, 40, 42, 44 extend parallel to the direction A of the longitudinal axis of the air-core coil 22. The permanent magnets 38, 40, 42, 44 are, for their part, oriented such that opposite poles (N, S) always face each other in the directions B and C.

With respect to the direction B, in this way two magnetic fields build up which are arranged next to each other and have opposite orientations (opposite principal directions) and the field lines of which each traverse the longitudinal gap 46 mostly in the direction C parallel to the axis of rotation D.

For the sake of simplicity, for indications of direction (left, right, etc.) reference will be made below to the illustration of FIG. 5, unless specified otherwise. Accordingly, the left magnetic field of the permanent magnets 38, 42 penetrates the left half 22a of the air-core coil 22, whereas the right magnetic field of the permanent magnets 40, 44 penetrates the right half 22b of the air-core coil 22. Yoke plates 48 intensify these magnetic fields.

As can be seen in FIG. 6, the ends 28 of the windings are connected in an electrically conducting manner via two helical springs 52, 54 to the electrical connectors 34, 36 firmly attached to the actuator housing 18. The electrically conductive helical springs 52, 54 are each supported, on the one hand, at a housing projection 56 protruding inwards and, on the other hand, on one of the arms 58, 60 of the rocker 50. A first one of the two helical springs 52, 54 is designed to be stronger than the second one and in this way assumes the function of a restoring element.

In the currentless initial condition of the electrodynamic actuator, the first helical spring 52, which is designed stronger, pushes the associated first rocker arm 58 downward, so that the control element assumes the swiveled position which is best visible in FIGS. 5 and 6. In this position, the first rocker arm 58 presses that part of the diaphragm 16 which is the left part with respect to FIG. 5 onto the associated first valve seat 14a and closes it, while at the same time the second rocker arm 60, which is removed from the right part of the diaphragm 16, exposes the second valve seat 14b.

When a direct current is applied to the air-core coil 22 via the electrical connectors 34, 36, the current flow directions in the left and right halves 22a, 22b of the air-core coil 22 here are just as opposite as the directions of the left and right magnetic fields. Therefore, with a "correct" polarity of the voltage applied, a Lorentz force directed to the right acts on both air-core coil halves 22a, 22b. This causes the control element to be swiveled clockwise about the axis of rotation D contrary to the preload of the first helical spring 52. Consequently, the first rocker arm 58 no longer presses on the left part of the diaphragm 16, but the second rocker arm 60 presses on the right part of the diaphragm 16. As a result, the first valve seat 14a is opened and the second valve seat 14b is closed. As soon as the current is switched off, the Lorentz force is no longer present, and the restoring element in the form of the first helical spring 52 pushes the control element back to the initial condition again.

The first helical spring 52 here fulfils a dual function as a restoring element and as an electrical connection between one of the winding ends 28 of the air-core coil 22 and one of the electrical connectors 34, 36.

In place of the diaphragm 16, provision may also be made for sealing members which are connected with or coupled to the rocker arms 58, 60 and which close or open a valve seat. In this case, the valve seats may be formed in a one-piece fluid housing.

In both embodiments, the actuator housing 18 itself may be formed as a shielding housing made from a suitable material to shield the magnetic fields of the permanent magnets 38, 40, 42, 44 to the outside and to avoid any impairments of the magnetic fields. But the actuator housing 18 may also be formed, e.g., from a plastic material if shielding plates for shielding the magnetic fields are accommodated therein. Ideally, the yoke plates 48 take over the shielding function. Suitable materials for the yoke plates for shielding and for simultaneous strengthening of the magnetic fields of the permanent magnets 38, 40, 42, 44 include, for example, FeNi alloys (an optimum ratio of Fe:Ni=50:50 here) or FeCo alloys.

The air-core coil 22 need not necessarily have the same shape as in the embodiments described above; it may be generally oval-shaped, circular or also rectangular. The air-core coil 22 also need not necessarily be received in a coil carrier 20; it may also be arranged on a coil carrier.

A third embodiment of a microvalve 10" including an electrodynamic actuator will now be described below, which is illustrated in FIGS. 7 to 13. The third embodiment is similar to the second embodiment, so that reference can largely be made to the explanations above. Therefore, the following is primarily a discussion of those features which constitute the differences between the second and third embodiments.

Figure 11:
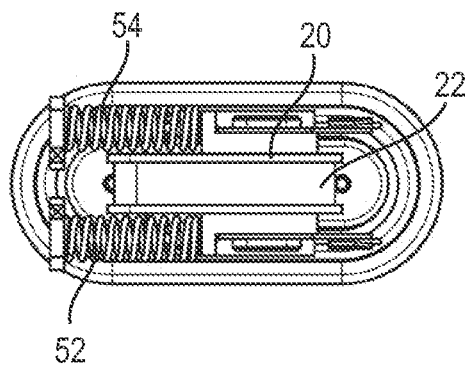
FIG. 11 shows a top view of the components from FIG. 9.
Figure 10:
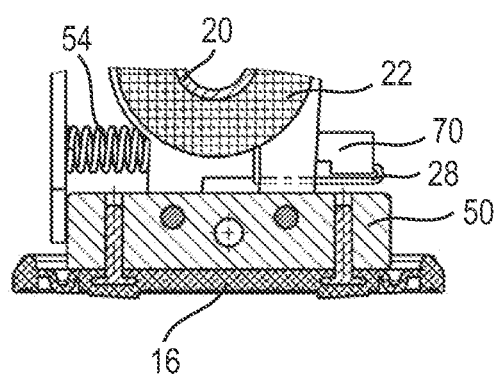
FIG. 10 shows a sectional detail view of the components from FIG. 9.

As is apparent in particular from FIGS. 9 to 11, the air-core coil 22 is not received in the coil carrier 20, but is wound on it. The coil carrier 20 resembles a motor vehicle wheel rim or bicycle rim (apart from the oval basic shape), in particular in view of the supporting surface for the winding, which is limited by walls on both end faces.

The electrical contacting of the air-core coil 22 is effected by means of two electrical connectors 34, 36 which are configured as pins and, together with a housing extension 62, form a plug connector (male or female connector). The pins are component parts of two elongated stamped parts 64, 66 made of brass, bronze or some other suitable electrically conductive material, which extend side by side next to the coil carrier 20 in the longitudinal direction thereof. The stamped parts 64, 66 are pressed in the actuator housing 18.

A respective end of an electrically conductive helical spring 52, 54 laterally rests against the respective ends of the stamped parts 64, 66 opposite the pins. The helical springs 52, 54 are arranged parallel to each other and are each seated on an end of an electrically conductive contact plate 68, 70. The other ends of the helical springs 52, 54 rest against laterally projecting extensions of the coil carrier 20.

The contact plates 68, 70 are specially shaped and bent. More specifically, the contact plates 68, 70 have stamped depressions which serve as seats for the helical springs 52, 54. Furthermore, the contact plates 68, 70 include mounts 72, 74 for the winding ends 28 of the air-core coil 22, so that an electrical connection each is produced from one winding end 28 via the contact plate 68, 70 and the helical spring 52, 54 to the stamped part 64, 66 with the terminal pin 34, 36.

The contact plates 68, 70 are mechanically connected with the electrically non-conducting coil carrier 20. The coil carrier 20 itself is fastened to the rocker 50 by means of pins 76, the rocker 50 being formed separately here as a two-armed actuating lever and cooperating with the diaphragm 16. The coil carrier 20 along with the rocker 50 and the diaphragm 16 is adapted to swivel about the axis of rotation D which extends through the interior of the actuator housing 18 and is again oriented perpendicularly to the longitudinal axis of the coil carrier 20 and the air-core coil 22.

The coil carrier 20, the air-core coil 22, the rocker 50, the contact plates 68, 70, and the helical springs 52, 54 together constitute a preassembled unit.

Figure 12:
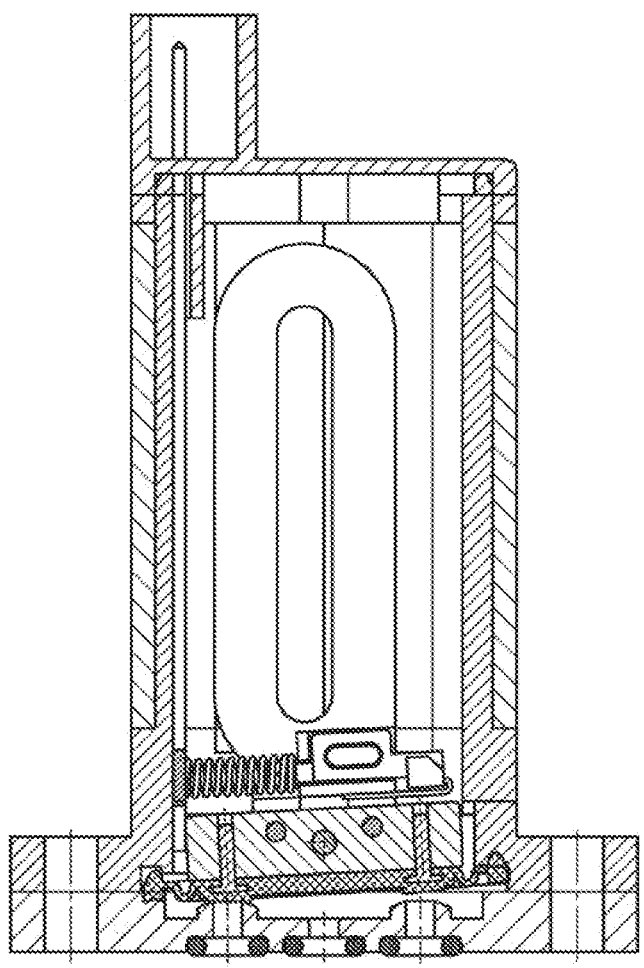
FIG. 12 shows a sectional view of the valve from FIG. 7 in a first switching position.
Figure 13:
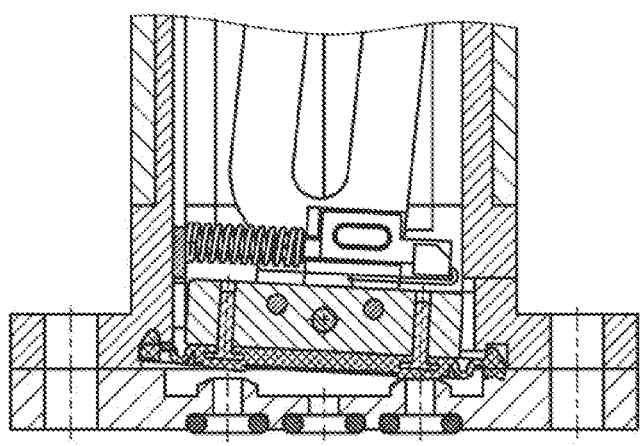
FIG. 13 shows a sectional detail view of the valve from FIG. 7 in a second switching position.

The general arrangement of the permanent magnets 38, 40, 42, 44 substantially corresponds to that of the second embodiment, only the magnets 38 and 40 being visible in FIGS. 7, 12 and 13. The permanent magnets 38, 40, 42, 44 may be attached directly to the inner wall of the actuator housing 18 and may constitute a further preassembled unit with the latter. The housing wall serves at the same time as a wall, as a yoke plate and as a shielding here.

As can be seen in FIG. 7, the actuator housing 18 is supplemented by a plastic cover 78 and a plastic insert 80. The cover 78 contains the previously mentioned housing extension which, together with the electrical connectors 34, 36 (pins), forms the plug connector. The insert 80 provides an electrical insulation between the outer (metallic) housing part and the contact plates 68, 70. In addition, the insert 80 serves as a holding means for the diaphragm 16.

In connection with this embodiment it should be noted that the coil carrier 20 with the air-core coil 22 assumes a slightly oblique position in the neutral position as shown in FIGS. 7 to 10, in which the rocker 50 is "balanced" and neither of the two valve seats 14a, 14b is closed by the diaphragm 16. More precisely, in the sectional plane of the two valve seats 14a, 14b as shown in FIG. 7, the longitudinal axis of the coil carrier 20 and of the air-core coil 22 is inclined by about 3 degrees relative to the longitudinal axes of the permanent magnets 38, 40, 42, 44. The longitudinal axes of the permanent magnets 38, 40, 42, 44, for their part, orient themselves by the housing walls, which are perpendicular with respect to a connecting line of the valve seats 14a, 14b.

In the currentless initial condition of the electrodynamic actuator, the two helical springs 52, 54 push the control element (coil carrier 20, air-core coil 22) to the position in which it is swiveled about the axis of rotation D as shown in FIG. 13. In this position the rocker 50 presses the diaphragm 16 on the first valve seat 14a and closes it, whereas the second valve seat 14b is exposed. In this first switching position, the helical springs 52, 54 are compressed only to a small extent. This means that in this position only a small amount of force is required to seal the first valve seat 14a.

When a direct current is applied to the air-core coil 22 via the electrical connectors 34, 36 and when the polarity is "correct", owing to the Lorentz force the control element is swiveled counterclockwise about the axis of rotation D against the preload of the helical springs 52, 54 until the second switching position shown in FIG. 12 is reached. In the second switching position, the first valve seat 14a is open and the second valve seat 14b is closed. The two helical springs 52, 54 are compressed to a maximum extent, for which reason a larger force is required for sealing the second valve seat 14b. In this switching position the best possible utilization of the Lorentz force is achieved in that the air-core coil 22 stands "straight", i.e. its longitudinal axis is parallel to the longitudinal axes of the permanent magnets 38, 40, 42, 44. In this position of the air-core coil 22 in relation to the permanent magnets 38, 40, 42, 44, the "force yield" is largest.

After the current is switched off, the Lorentz force is no longer present and the helical springs 52, 54 push the control element back to the initial condition again, i.e. to the first switching position. The two helical springs 52, 54 thus serve both for electrical contacting and also for an automatic restoring movement of the control element.

It is, of course, also possible to combine features of the above-described embodiments with each other in a suitable manner.

The electrodynamic actuator described with the aid of several exemplary embodiments may also be employed in fluidics otherwise, for example in a micropump.

LIST OF REFERENCE NUMBERS 10, 10', 10" microvalve
12a, 12b fluid housing halves
14 valve seat
14a, 14b valve seats
16 diaphragm
18 actuator housing
20 coil carrier
22 air-core coil
22a, 22b air-core coil halves
24 extension
26 core
28 winding end
30 leaf spring
32 leaf spring
34 electrical connector
36 electrical connector
38 permanent magnet
40 permanent magnet
42 permanent magnet
44 permanent magnet
46 longitudinal gap
48 yoke plate
50 rocker
52 first helical spring
54 second helical spring
56 housing projection
58 first rocker arm
60 second rocker arm
62 housing extension
64 stamped part
66 stamped part
68 contact plate
70 contact plate
72 mount
74 mount
76 pin
78 cover
80 insert

The invention claimed is:

1. A microvalve, comprising:
a fluid housing;
a valve seat arranged in the fluid housing;
a diaphragm clamped in the fluid housing and disposed on the valve seat; and
an electrodynamic actuator placed on the fluid housing and configured to control a movement of the diaphragm in order to open or close the valve seat,
wherein the electrodynamic actuator comprises:
an immovable actuator structure including a magnet arrangement consisting of a plurality of permanent magnets, and configured to generate magnetic fields;
a movable actuator structure including a control element having an air-core coil comprising a multitude of windings around a magnetically non-soft core, the air-core coil being arranged in the magnetic field and firmly coupled to a coil carrier made from a non-magnetic material, the air-core coil being received in or wound on the coil carrier, and the control element configured to move relative to the magnet arrangement; and
an extension part extended from the coil carrier and coupled with the diaphragm, and configured to open or close the valve seat by cooperating with the coupled diaphragm in response to a movement of the control element,
wherein the magnetic fields include
a first magnetic field having a first principal direction and
a second magnetic field having a second principal direction opposed to the first principal direction,
wherein the control element is mounted for swiveling movement about an axis of rotation that is parallel to the first and second principal directions of the magnetic fields, and
wherein the extension part is formed integrally with the coil carrier or is attached to the coil carrier.

2. The microvalve according to claim 1, wherein
a first half of the air-core coil is arranged in the first magnetic field, and
a second half of the air-core coil is arranged in the second magnetic field.

3. The microvalve according to claim 2, wherein the air-core coil has a shape of an oval with a longitudinal axis,
wherein the shape of the oval is a shape of a pair of complementary semicircles spaced from each other and having a linear middle piece connecting the semicircles, and wherein the longitudinal axis of the air-core coil divides the air-core coil into the first and second halves of the air-core coil.

4. The microvalve according to claim 1,
wherein the magnet arrangement includes a plurality of permanent magnets,
wherein, when the control element is located in a first switching position, the longitudinal axis of the air-core coil is extended parallel to a longitudinal axis of the permanent magnets.

5. The microvalve according to claim 4, wherein the permanent magnets are arranged such that permanent magnets facing each other face opposite poles.

6. The microvalve according to claim 1,
wherein the electrodynamic actuator further comprises an actuator housing configured to shield the magnetic fields of the magnet arrangement, and
wherein the magnet arrangement and the control element are accommodated in the actuator housing.

7. The microvalve according to claim 6, wherein
the electrical connector is connected to the restoring element, is extended outward along the longitudinal direction of the actuator housing, and is attached to the actuator housing so that one end of the electrical connector is protruded from the actuator housing.

8. The microvalve according to claim 1, wherein the electrodynamic actuator further comprises:
at least one yoke plate made of a magnetically soft material, configured to strengthen the magnetic fields of the magnet arrangement and shield the magnetic fields of the magnet arrangement to the outside.

9. The microvalve according to claim 8, wherein the yoke plate is part of an actuator housing.

10. The microvalve according to claim 9, wherein the permanent magnets are attached directly to the inner wall of the actuator housing to constitute a preassembled unit.

11. The microvalve according to claim 1, wherein
the air-core coil is wound on the coil carrier, and
the coil carrier includes a support surface for the winding that is limited by lateral walls.

12. The microvalve according to claim 1, wherein
the valve seat comprising first and second valve seats next to each other,
the extension part includes a two-armed actuating lever coupled with the diaphragm, and
the first and second valve seats are alternately opened and closed each other by the two-armed actuating lever.

13. A microvalve, comprising:
a fluid housing;
a valve seat arranged in the fluid housing;
a diaphragm clamped in the fluid housing and disposed on the valve seat; and
an electrodynamic actuator placed on the fluid housing and configured to control a movement of the diaphragm in order to open or close the valve seat,
wherein the electrodynamic actuator comprises:
an immovable actuator structure including a magnet arrangement consisting of a plurality of permanent magnets, and configured to generate magnetic fields;
a movable actuator structure including a control element having an air-core coil comprising a multitude of windings around a magnetically non-soft core, the air-core coil being arranged in the magnetic field and firmly coupled to a coil carrier made from a non-magnetic material, the air-core coil being received in or wound on the coil carrier, and the control element configured to move relative to the magnet arrangement;
an extension part extended from the coil carrier, coupled with the diaphragm, and configured to open or close the valve seat by cooperating with the coupled diaphragm in response to a movement of the control element; and
a restoring element forming at least part of an electrically conducting connection between a winding end of the air-core coil and an electrical connector, and configured to exert a preload on the control element, and
wherein the extension part is formed integrally with the coil carrier or is attached to the coil carrier.

14. The microvalve according to claim 13, wherein the restoring element includes at least one leaf spring or helical spring.

15. The microvalve according to claim 13,
wherein, when the control element is located in a first switching position, the longitudinal axis of the air-core coil is extended parallel to a longitudinal axis of the permanent magnets, and
wherein the restoring element is configured to exert the preload on the control element away from the first switching position towards a second switching position.

16. A microvalve, comprising:
a fluid housing;
a valve seat arranged in the fluid housing;
a diaphragm clamped in the fluid housing and disposed on the valve seat; and
an electrodynamic actuator placed on the fluid housing and configured to control a movement of the diaphragm in order to open or close the valve seat,
wherein the electrodynamic actuator comprises:
an immovable actuator structure including a magnet arrangement consisting of a plurality of permanent magnets, and configured to generate magnetic fields;
a movable actuator structure including a control element having an air-core coil comprising a multitude of windings around a magnetically non-soft core, the air-core coil being arranged in the magnetic field and firmly coupled to a coil carrier made from a non-magnetic material, the air-core coil being received in or wound on the coil carrier, and the control element configured to move relative to the magnet arrangement;
an extension part extended from the coil carrier, coupled with the diaphragm, and configured to open or close the valve seat by cooperating with the coupled diaphragm in response to a movement of the control element;
an electrically conductive stamped part fastened to a housing of the electrodynamic actuator; and
an electrically conductive restoring element configured to exert a preload on the control element, and
wherein the electrically conductive stamped part is mechanically acted upon by the electrically conductive restoring element to provide an electrically conducting connection between at least one winding end of the air-core coil and an electrical connector of the actuator, wherein the magnetic fields include a first magnetic field having a first principal direction and a second magnetic field having a second principal direction opposed to the first principal direction, wherein the control element is mounted for swiveling movement about an axis of rotation that is parallel to the first and second principal directions of the magnetic fields, and wherein the extension part is formed integrally with the coil carrier or is attached to the coil carrier.

17. The microvalve according to claim 16, wherein the stamped part includes a pin which, together with a housing extension, is part of a female connector, and the housing extension is formed in a plastic part of the housing.

18. A microvalve, comprising:
a fluid housing;
a valve seat arranged in the fluid housing;
a diaphragm clamped in the fluid housing and disposed on the valve seat; and
an electrodynamic actuator placed on the fluid housing and configured to control a movement of the diaphragm in order to open or close the valve seat,
wherein the electrodynamic actuator comprises:
    an immovable actuator structure including a magnet arrangement consisting of a plurality of permanent magnets, and configured to generate magnetic fields;
    a movable actuator structure including a control element having an air-core coil comprising a multitude of windings around a magnetically non-soft core, the air-core coil being arranged in the magnetic field and firmly coupled to a coil carrier made from a non-magnetic material, the air-core coil being received in or wound on the coil carrier, and the control element configured to move relative to the magnet arrangement;
    a contact plate having an electrically conductive restoring element received thereon which exerts a preload on the control element; and
    an extension part extended from the coil carrier, coupled with the diaphragm, and configured to open or close the valve seat by cooperating with the coupled diaphragm in response to a movement of the control element, and
wherein contact plate is configured to provide an electrically conducting connection between at least one winding end of the air-core coil and an electrical connector of the actuator, wherein the magnetic fields include a first magnetic field having a first principal direction and a second magnetic field having a second principal direction opposed to the first principal direction, wherein the control element is mounted for swiveling movement about an axis of rotation that is parallel to the first and second principal directions of the magnetic fields, and wherein the extension part is formed integrally with the coil carrier or is attached to the coil carrier.

19. The microvalve according to claim 18, wherein the contact plate includes a mount for the winding end.

20. The microvalve according to claim 18, wherein the coil carrier, the air-core coil, the extension part, the one contact plate, and the restoring element constitute a preassembled unit.

21. The microvalve according to claim 18, wherein the electrodynamic actuator further comprises:
a housing having a plastic insert which establishes an electrical insulation between the housing and the contact plate.

22. A fluidic component, the fluidic component comprising:
a fluid housing;
a valve seat arranged in the fluid housing;
a diaphragm clamped in the fluid housing and disposed on the valve seat; and
an electrodynamic actuator placed on the fluid housing and configured to control a movement of the diaphragm in order to open or close the valve seat,
wherein said electrodynamic actuator comprises:
    an immovable actuator structure including a magnet arrangement configured to generate magnetic fields;
    a movable actuator structure including a control element having an air-core coil comprising a multitude of windings around a magnetically non-soft core, the air-core coil being arranged in the magnetic field and firmly coupled to a coil carrier made from a non-magnetic material, the air-core coil being received in or wound on the coil carrier, and the control element configured to move relative to the magnet arrangement; and
    an extension part extended from the coil carrier, coupled with the diaphragm, and configured to open or close the valve seat by cooperating with the coupled diaphragm in response to a movement of the control element,
wherein the magnetic fields include
    a first magnetic field having a first principal direction and
    a second magnetic field having a second principal direction opposed to the first principal direction,
wherein the control element is mounted for swiveling movement about an axis of rotation that is parallel to the first and second principal directions of the magnetic fields, and
wherein the extension part is formed integrally with the coil carrier or is attached to the coil carrier.

* * * * *